UNITED STATES PATENT OFFICE.

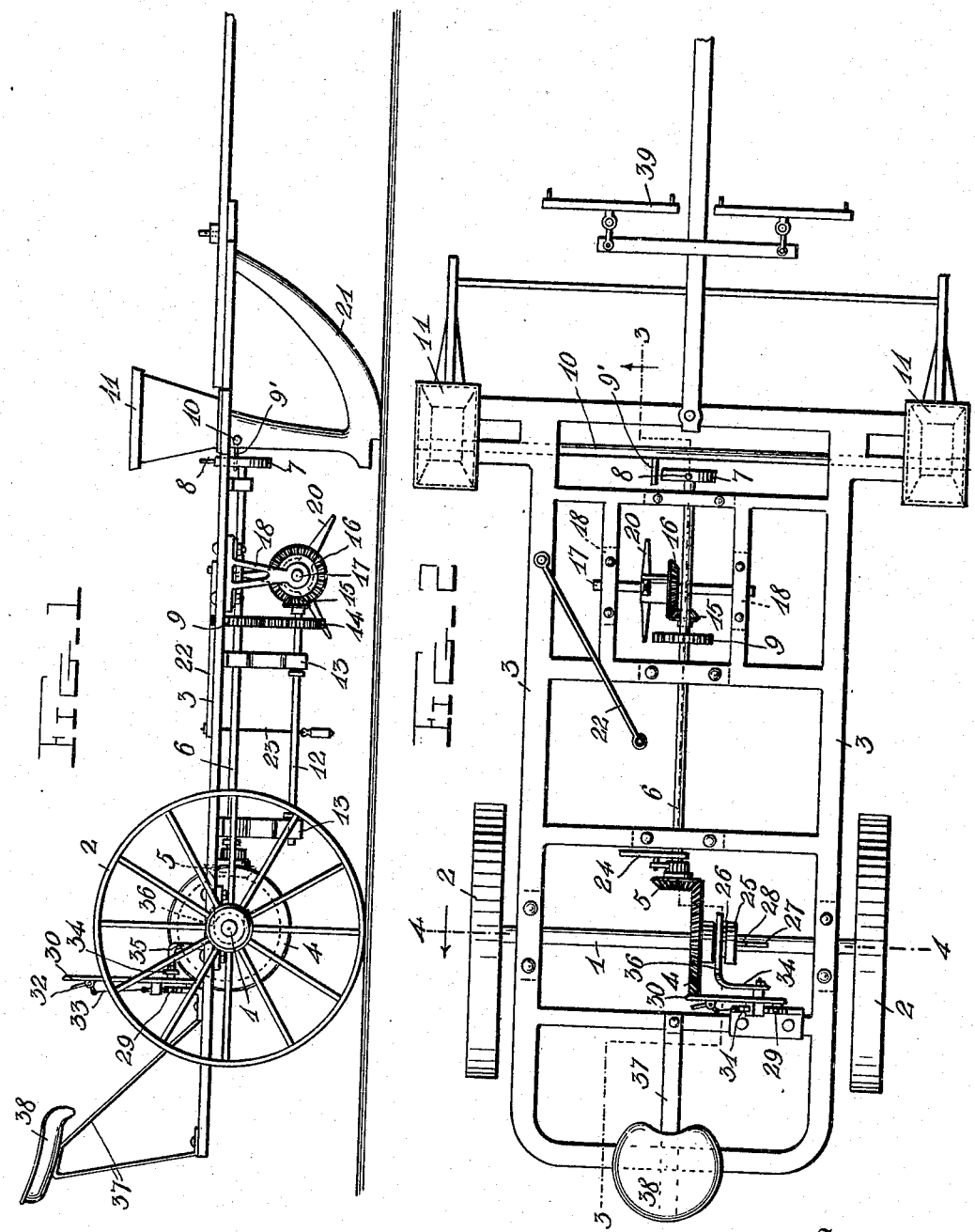

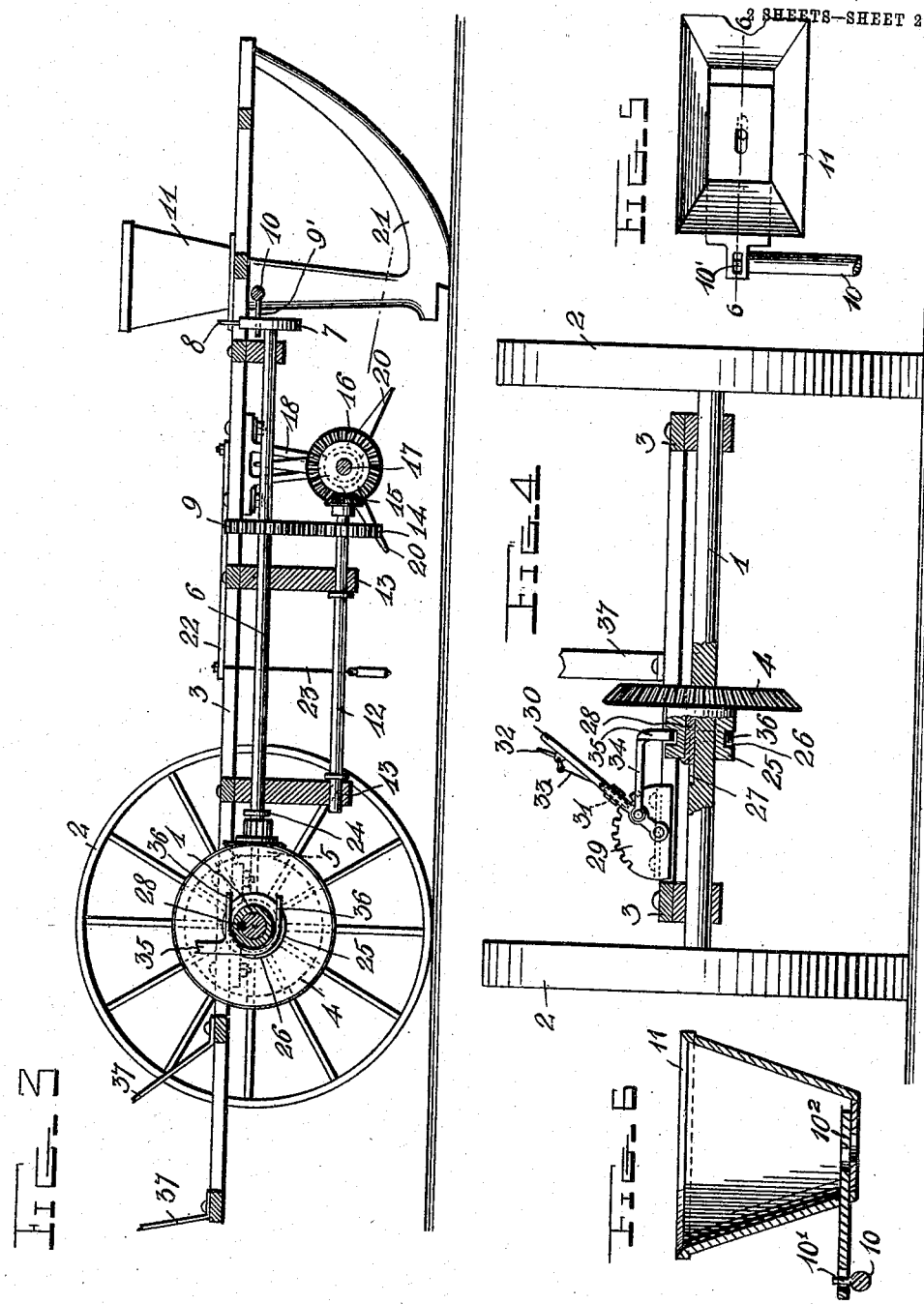

THOMAS F. DONHAM, OF TERRE HAUTE, INDIANA.

CHECK-ROW CORN-PLANTER.

937,287.

Specification of Letters Patent.    Patented Oct. 19, 1909.

Application filed November 27, 1908. Serial No. 464,709.

*To all whom it may concern:*

Be it known that I, THOMAS F. DONHAM, a citizen of the United States, residing at Terre Haute, in the county of Vigo and State of Indiana, have invented certain new and useful Improvements in Check-Row Corn-Planters; and I do declare the following to be a full, clear, and exact description of the invention, such as will enable others skilled in the art to which it appertains to make and use the same.

My invention has relation to new and useful improvements in check row corn planters, and essentially consists in providing an ordinary planter with means for dropping the corn or other seed to be planted predetermined and equal distances apart, means for marking the place where the seed is deposited, and with means for indicating whether or not the corn is being dropped accurately.

With these ends in view my invention consists in the novel construction, combination and arrangement of parts as illustrated in the drawings and set forth in the specification and claims hereunto appended.

In the accompanying drawings, in which like parts are designated by like characters throughout the several views,—Figure 1 is a side elevation of my invention; Fig. 2 is a top plan view; Fig. 3 is a longitudinal sectional view, on the line 3—3 of Fig. 2; and Fig. 4 is a transverse sectional view, on the line 4—4 of Fig. 2. Fig. 5 is a detail plan view of one of the hoppers; and Fig. 6 is a vertical longitudinal section taken on line 6—6 of Fig. 5.

My invention is described as follows:

The numeral 1 represents the main axle, near the ends of which are journaled the supporting wheels 2. A frame 3 of suitable construction is mounted on said main axle 1. Slidably connected to said main axle intermediate of its length is a bevel gear 4 adapted to mesh with a pinion 5 rigidly connected to the rear end of a longitudinal shaft 6 journaled in suitable bearings of said frame 3 and provided at its front end with a disk 7 provided on its periphery with a horizontal finger or eccentric 8. Rigidly connected to said longitudinal shaft 6 a suitable distance rearward of said disk 7 is a gear 9, the purpose of which will be disclosed. When the planter is in operation, the finger or eccentric 8 of said disk 7 engages an integral rearwardly extending finger 9′ of a transverse rock-shaft 10 located between the two grain boxes or hoppers 11 securely mounted on the front end of the frame 3, opposite said disk 7, of said longitudinal shaft 6. The rock shaft 10 is actuated at each revolution of the shaft 6 and is provided at opposite ends with fingers or portions 10′ which extend through the inner ends of slides 10² adapted to close and disclose the discharge openings in the bottoms of the hoppers 11 whereby the seed is intermittently dropped from said hoppers to the ground. Rigidly connected to a longitudinal shaft 12, journaled in suitable bearings 13 of the planter frame immediately under said longitudinal shaft 6 in position to mesh with said gear 9 is a similar gear 14. Said shaft 12 is also provided at its front end forward of and contiguous or nearly so with said gear 14 with a pinion 15, adapted to mesh at right angles with a bevel gear 16, secured on a transverse shaft 17, journaled in suitable bearings 18 of said frame. Said bevel gear 16 is provided on one face with three integral fingers or markers 20, which are located equi-distances apart and are of preferably wedge-shaped form. The numeral 21 represents the planter or furrow opener shoes, which are located at the front end of the planter frame immediately under the seed boxes or hoppers. Said markers or fingers 20 are of such a length that they penetrate into the ground a sufficient distance to leave visible marks between the corn hills. Said bevel gear 16 and pinion 15 are so arranged that one of the markers or fingers 20 penetrates into the ground just as the finger or eccentric 8, of the disk 7, engages the finger 9′ of the rock shaft 10, or in other words, just as the corn is dropped from the hoppers. To do this, the said gears 14 and 9 are the same size and bevel gear 16 equipped with three times the number of teeth as said pinion.

A rod 22, twice the length of the distance of two corn rows is pivotally connected to the planter frame between the corn hills and is provided with a short plumb line 23 or other equivalent means for pointing directly to the mark between the last two hills, just as the click of the machine indicates that new hills are being planted.

In turning at the end of a field or driving around stumps or the like, the furrow opener shoes 21 are lifted from the ground by tilting the machine backward and said bevel gear 4 of the main axle 1 is thrown out of engagement with said pinion 5, when the wheels 2 turn without operating the planter. When the operator has his machine in position again, before lowering the furrow opener shoes 21 and putting the machine in gear he turns said pinion 5 of said longitudinal shaft 6 by means of a ratchet lever 24 until the finger or eccentric 8 of the disk 7 engages the finger 9' of the rock shaft 10 and the lower marker or finger 20 of said bevel gear 16 assumes a vertical position.

To enable the operator to throw the bevel gear 4 in and out of engagement with said pinion 5 of said longitudinal shaft 6 and thereby throw the planter in and out of gear, said bevel gear is provided with an integral hub 25 having a horizontal keyway, and a groove 26 around its periphery. The main axle 1 is provided immediately under said bevel gear and hub with a keyway 27, and a suitable key 28 is employed to key the bevel gear and hub to the main axle. A segmental rack 29 is securely mounted on the planter frame 3 opposite said bevel gear 4 and is provided on one face with a lever 30, having a spring pawl 31. Said lever is provided with a grip 32 and connecting rod 33 for releasing the pawl from engagement with said segmental rack. A gear shifter 34 is connected at one end to said lever 30 and is provided at its inner end with a fork 36 to receive the grooved portion of the periphery of the hub 25 of said bevel gear 4. By means of the above described mechanism said bevel gear may be thrown out of engagement with said pinion by releasing the spring pawl 31 from engagement with the rack 29 and throwing the free end of the lever 30 in the proper direction.

A seat bar 37 carrying a seat 38 is secured to the planter at any suitable point. Said planter is also provided with the usual draft means 39 for drawing it along.

Having thus described my invention, what I claim as new and desire to secure by Letters-Patent, is:—

1. In a check row corn planter, a supporting frame, hoppers mounted on the front end of said frame immediately opposite each other, slides having openings to register with the discharge openings of the hoppers, a rock shaft connected at opposite ends to said slides and adapted to actuate the same to close and disclose the discharge openings of the hoppers, a finger projecting laterally from the rock shaft, a longitudinal operating shaft mounted in the supporting frame, a disk having a finger to engage the finger of the rock shaft at each revolution, means for driving the operating shaft from the main axle, a marker provided with a series of marking fingers rotatably mounted beneath the operating shaft, and gearing for operating the marker from said shaft.

2. In a check row corn planter, a supporting frame, hoppers mounted on the front end of said frame, immediately opposite each other, slides having openings to register with the discharge openings of the hoppers, a rock shaft connected at opposite ends to said slides and adapted to actuate the same to close and disclose the discharge openings of the hopper, a finger projecting laterally from the rock shaft, a longitudinal operating shaft mounted in the supporting frame, a disk having a finger to engage the finger of the rock shaft at each revolution, means for driving the operating shaft from the main axle, a marker provided with a series of marking fingers rotatably mounted beneath the operating shaft, gearing for operating the marker from said shaft, and mechanism under the control of the operator for throwing the operating shaft into and out of gear.

3. In a check row corn planter, a main supporting frame, hoppers mounted thereon, slides having openings to register with the discharge openings of the hoppers, a transverse operating shaft connected at opposite ends with the slides for operating the latter, means for intermittently actuating the rock shaft, a marking wheel mounted in rear of the rock shaft to mark the points where the seed is deposited, and an indicator to indicate the hills previously planted when the machine is planting new hills.

In testimony whereof I have hereunto set my hand in presence of two subscribing witnesses.

THOMAS F. DONHAM.

Witnesses:
E. H. REDMAN,
E. G. LEE.